United States Patent [19]

Wright

[11] 4,447,785

[45] May 8, 1984

[54] BATTERY CHARGER ASSEMBLY

[76] Inventor: Bruce R. Wright, 1006 Nana, St. Louis, Mo. 63131

[21] Appl. No.: 363,452

[22] Filed: Mar. 30, 1982 (Under 37 CFR 1.47)

[51] Int. Cl.³ .................................................. H02J 7/00
[52] U.S. Cl. ....................................... 320/25; 320/48; 340/636
[58] Field of Search ...................... 320/2, 3, 4, 5, 6, 8, 320/25, 48, 53, 57, 59; 340/636

[56] References Cited

U.S. PATENT DOCUMENTS

| | | | |
|---|---|---|---|
| 3,267,452 | 8/1966 | Wolf | 320/48 |
| 3,659,183 | 4/1972 | Carlson | 320/48 |
| 4,240,022 | 12/1980 | Kilinskis et al. | 320/59 |
| 4,251,151 | 2/1981 | Toyota | 340/636 |

*Primary Examiner*—William M. Shoop
*Assistant Examiner*—Anita M. Ault
*Attorney, Agent, or Firm*—Cohn, Powell & Hind

[57] ABSTRACT

A battery charger assembly for charging a battery includes a battery charger power supply having a positive output and a negative output for providing a rectified DC voltage output. A negative cable is connected to the negative output and a positive cable is connected to the positive output with clamps being connected to each of the cables. A polarity indicator including a test contact, a first indicator for indicating a first polarity connection and a second indicator for indicating a second opposite polarity connection is electrically connected to one of the cables. The first and second indicators are connected for indicating if the battery charger voltage output is greater than the voltage of the battery. An electrical connection is provided between the positive and negative cables for actuating the indicators.

8 Claims, 6 Drawing Figures

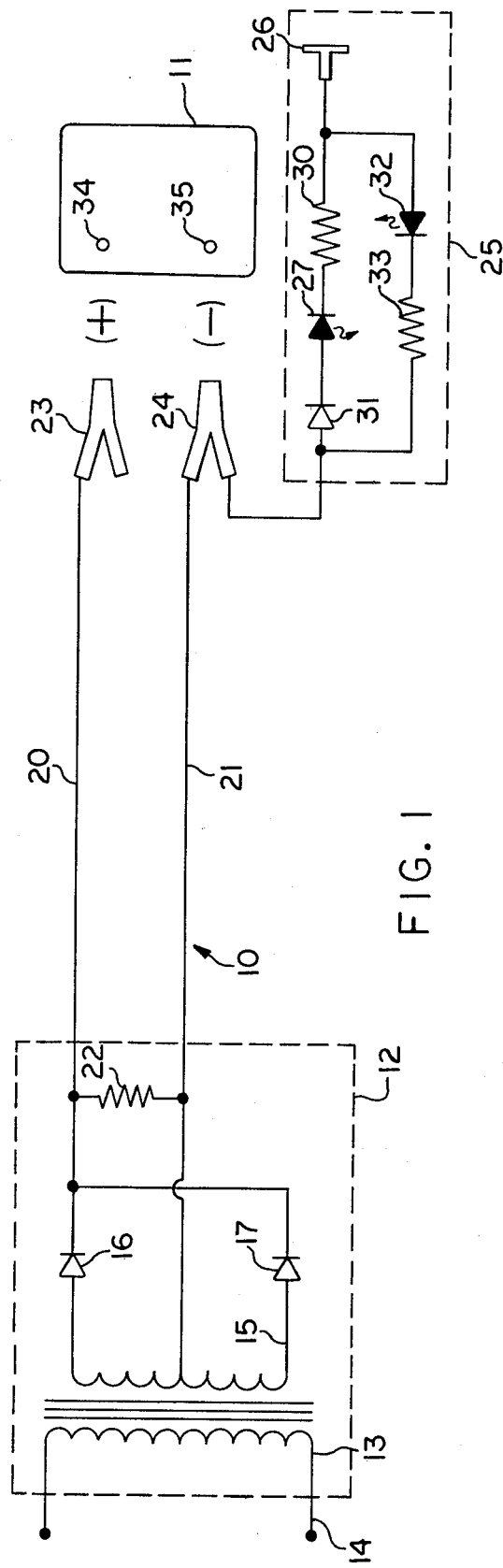
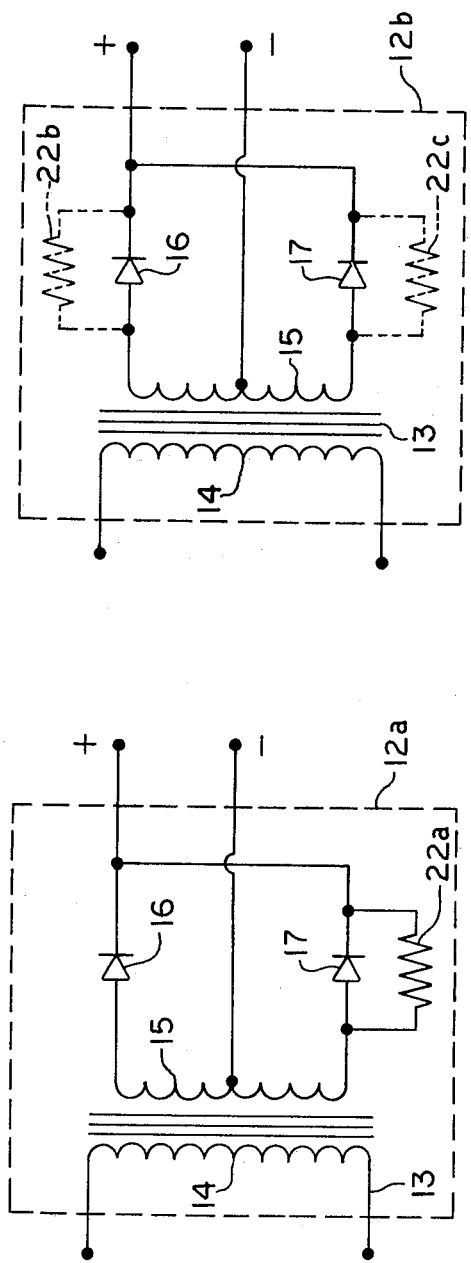
FIG. 1
FIG. 2
FIG. 3

BATTERY CHARGER ASSEMBLY

BACKGROUND OF THE INVENTION

This invention relates to battery chargers in general, and in particular to battery chargers having means for indicating the polarity of connection of the charger and for indicating any voltage mismatch between the battery charger and battery.

When charging batteries of the type that are commonly used in automobiles, trucks and other vehicles, it is extremely important that a proper determination of polarity be made before the battery charger is actuated to charge a battery.

Furthermore, it is important to avoid arcing and sparks when battery terminals are connected to a battery because such arcing and sparks can ignite gases present within batteries, thereby causing dangerous explosions. Where the voltage of a charger and the battery are closely matched at the time of connecting clamps to the battery terminals, there is less likelihood of arcing and sparks than there would be if the voltage output of the battery charger is substantially greater than the battery voltage.

It is therefore important that both the polarity of connection and excesive differences in the voltages be indicated to the operator of a battery charger in order to minimize the risk of incorrect connection of a battery charger to a battery and to minimize the likelihood of a battery explosion.

SUMMARY OF THE INVENTION

This battery charger assembly includes means for determining the polarity of connection of the battery charger clamps to the battery and for indicating excessive voltage output from the battery charger relative to the battery to be charged.

The battery charger assembly for charging a battery includes a battery charger power supply having a positive output and negative output for providing a rectified DC voltage output. A negative cable is connected to the negative output and the positive cable is connected to the positive output. A pair of clamps are provided, with one clamp being connected to each of the cables. Means provide an electrical connection between the positive and negative cables. The polarity indicating means is electrically connected to one of the cables. The polarity indicating means includes a test contact for contacting a terminal of the battery, and a first indicator for indicating a first polarity connection.

In one aspect of the invention, the polarity indicating means includes a second indicator for indicating a second opposite polarity connection. The first and second indicators are connected for indicating when the battery charger voltage is greater than the voltage of the battery being charged.

In another aspect of the invention, the means providing the electrical connection between the positive and negative cables comprises a resistor connected therebetween. In yet another aspect of the invention, the battery charger power supply includes a rectifier diode, and the means providing the electrical connection between the positive and negative cables comprises a resistor in parallel with the rectifier diode. In still another aspect of the invention, the battery charger power supply includes a selenium rectifier with the selenium rectifier providing the means constituting the electrical connection between the positive and the negative cables.

In one aspect of the invention, the polarity indicating means is carried by and electrically connected to one of the clamps. In another aspect of the invention, said one clamp includes opposed side jaw contacts. The cable associated with said one clamp is electrically connected to one of the jaw contacts. The polarity indicating means is electrically connected to the other jaw contact. The jaw contacts electrically engage when the clamp is closed to electrically connect the polarity indicating means to the said cable.

BRIEF DESCRIPTION OF THE DRAWINGS

FIG. 1 is an electrical schematic view of a battery charger assembly;

FIG. 2 is an electrical schematic view of a modified battery charger power supply;

FIG. 3 is an electrical schematic view of an additional modified battery charger power supply;

DESCRIPTION OF THE PREFERRED EMBODIMENT

Figure 4:
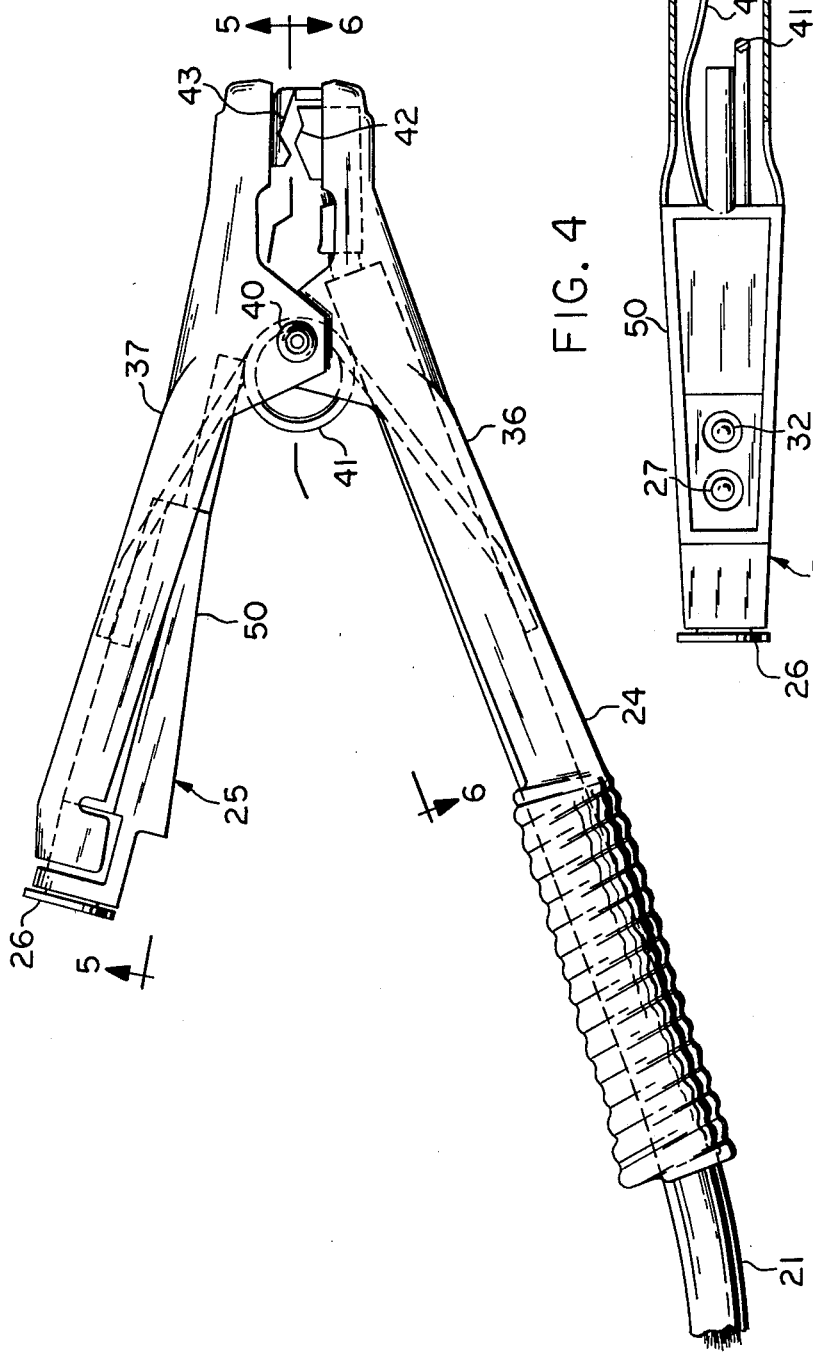
FIG. 4 is a side elevational view of a battery charger clamp and polarity indicating means.

Referring now by characters of reference to the drawings and first to FIG. 1, it will be understood that the battery charger assembly indicated by 10 is utilized for charging a battery 11. This battery charger assembly 10 includes a battery charger power supply 12.

The battery charger power supply 12 includes a transformer 13 having a primary winding 14 and a center tapped secondary winding 15. A pair of rectifier diodes 16 and 17 are connected to the transformer secondary winding 15 in a conventional manner to provide a full wave rectifier output. A positive booster cable 20 is connected to the positive output of the power supply 12, while a negative booster cable 21 is connected to the negative output of the power supply 12. A resistor 22 is connected between the positive and negative outputs of the power supply 12, the resistor 22 constituting means providing an electrical connection between the positive and negative cables 20 and 21.

A positive battery terminal clamp 23 and a negative battery terminal clamp 24 are connected to the positive and negative battery booster cables 20 and 21 respectively.

Polarity indicating means, indicated generally by 25, is electrically connected to one of the cables 20 and 21. In the embodiment disclosed in FIG. 1, the polarity indicating means 25 is connected to the negative booster cable 21. The polarity indicating means 25 includes a test contact 26.

A first indicator constituting a green LED 27 (light emitting diode) is serially connected to a resistor 30 and diode 31 between the test contact 26 and the battery clamp 24. A second indicator constituting a red LED 32 is serially connected with a resistor 33 between the test contact 26 and the battery clamp 24. The second LED 32 is positioned such as to have an opposite polarity connection from that of the first LED 27.

The battery 11 conventionally includes a positive terminal 34 and a negative terminal 35 to which the clamps 23 and 24 respectively can be connected for charging the battery 11.

Figure 5:
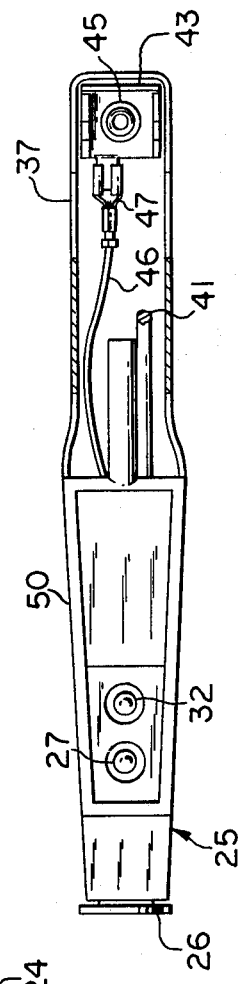
FIG. 5 is a cross-sectional view taken on line 5—5 of FIG. 4.
Figure 6:
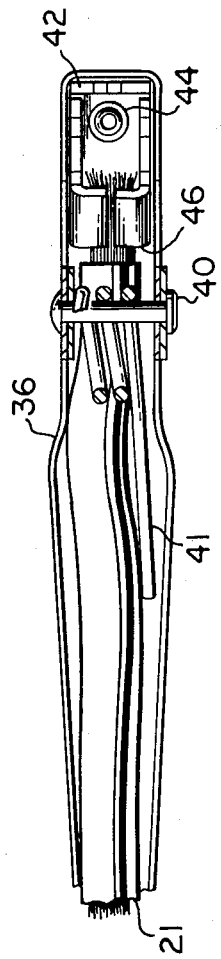
FIG. 6 is a cross-sectional view taken on line 6—6 of FIG. 4.

Referring now to FIGS. 4-6, the battery booster clamp 24 is shown in detail. The battery booster clamp 24 includes opposed handle portions 36 and 37 hingedly connected by rivet 40. A tension spring 41 about the rivet 40 engages at its opposed ends the handle portions 36 and 37, the spring 41 tending to hold the clamp 24 in the closed position shown in FIG. 4.

A pair of opposed side jaw contacts 42 and 43 are carried by the clamp portions 36 and 37 respectively. The jaw contact 42 is connected to the clamp portion 36 by rivet 44 (FIG. 6) while the jaw contact 43 is connected to the clamp portion 37 by rivet 45 (FIG. 5). The negative booster cable 21 is electrically connected to the jaw contact 42 as by the crimp connection 46. The polarity indicating means 25 (FIG. 5) is connected as by wire 46 and spade lug 47 to the jaw contact 43.

As is best seen in FIG. 5, the polarity indicating means 25 is housed in a plastic member 50 which is snap-fitted into the clamp portion 37. The test contact 26 projects beyond the end of the clamp portion 37 while the LED 27 and 32 are housed within the plastic member 50 between the clamp portions 36 and 37 for mechanical protection while affording visibility to the user.

The jaw contacts 42 and 43 are not electrically connected to the terminal clamp portions 36 and 37. The clamp portions 36 and 37 are coated with a non-conductive material such as a rubber or plastic to effectively electrically isolate the termminal jaw contacts 42 and 43.

Referring now to FIGS. 1-3, alternate power supplies 12a and 12b respectively are shown. The power supply 12a of FIG. 2 is similar to the power supply 12 of FIG. 1. However, a resistor 22a is connected in parallel with the one of the diodes 16 and 17. As shown in FIG. 2, the resistor 22a is connected in parallel with the diode 17. The resistor 22a provides means electrically connected to the positive and negative booster cables 20 and 21.

In FIG. 3, the power supply 12b discloses a power supply using selenium rectifiers for the diodes 16 and 17. The selenium rectifier diodes 16 and 17 include intrinsic resistance indicated by 22b and 22c which will provide sufficient reverse current through the selenium diodes 16 and 17 to provide the means for electrically connecting the booster cables 20 and 21.

While the power supplies 12, 12a and 12b of FIGS. 1-3 have been shown as including conventional full wave rectifiers utilizing center tapped transformer secondaries 15, it will be readily apparent to anyone skilled in the art that other rectifier arrangements can be utilized. For instance, a conventional half wave rectifier arrangement can be employed by simply removing either of the diodes 16 and 17 of FIGS. 1 and 3 or the diode 16 of FIG. 2. Similarly, a full wave bridge rectifier circuit could readily be employed.

It is thought that the structural features and functional advantages of this battery charger assembly have become fully apparent from the foregoing description of parts, but for completeness of disclosure the operation of the device will be briefly discussed.

Referring first to the battery charger assembly of FIG. 1, it will be understood that when charging a battery 11 the power supply 12 is connected to a source of alternating current such as by connecting the transformer primary winding 14 to a conventional 120 volt circuit. When powered, a full wave rectified DC voltage will appear across the battery booster cables 20 and 21 and across the resistor 22.

For illustration purposes it will first be assumed that there is no power applied to the power supply 12. In order to determine proper polarity of connection of the battery booster clamps 23 and 24, the booster clamp which does not include the test contact 26 is connected to one of the battery terminals 34-35. Then the test contact 26 is brought into contact with the other of the battery terminals 34 and 35.

If the battery booster clamp 23 had been connected to the negative battery terminal 35, and the test terminal 26 is connected to the positive battery terminal 34, an electrical circuit will be completed. The circuit will be through the test contact 26, the LED 32 and resistor 33, through the jaw contact 43 and the jaw contact 42 to the negative battery cable 21.

At the battery power supply 12 there would be three parallel connections for current flow between the battery booster cables 21 and 20. One path of current flow would be through the resistor 22, while the other paths of current flow would be through either half of the transformer secondary winding 15 and through the diodes 16 and 17 and to the positive battery booster cable 20. The positive battery booster cable 20 which is connected by its battery clamp 23 to the negative battery terminal 35 completes the circuit. With this connection, there would be no current flow through the green LED 27 and its series diodes 31 as they would be reversed biased. Therefore, only the red LED 32 would light, thereby indicating to the operator of the battery charger that the connections of the terminal clamp 23 was incorrect and should be reversed.

Assuming now that the positive battery terminal clamp 23 is connected to the positive battery terminal 34 and the test contact 26 is connected to the negative battery terminal 35, again with no power applied to the power supply 12, an electrical circuit is again completed. The electrical current is now through the positive battery terminal clamp 23, through the positive booster cable 20, through the resistor 22 in the power supply 12, to the negative battery cable 21 and to the negative battery booster clamp jaw contact 42 and the jaw contact 43, and then to the diode 31, green LED 27, resistor 30, and the test contact 26 to the negative battery terminal 35.

In this connection, only the green LED 27 would light as the red LED 32 would be reversed biased. Upon this indication, the operator of the battery booster assembly 10 would then know that the proper polarity of connection had been determined and the negative booster clamp 24 could be connected to the negative battery terminal 35, and then power could be applied to the power supply 12 for charging the battery 11.

For the battery supply 12a of FIG. 2, the same results can be achieved with a slightly different flow of current to the polarity indicating means 25. When the positive battery booster clamp 23 is connected to the positive battery terminal 34, and the test contact 26 is connected to the negative battery terminal 35, the flow of current for lighting the green LED 27 would be through the resistor 22a and the associated half of the secondary winding 15 of the transformer 13 to the negative battery booster cable 21. On reversing the connection by connecting the positive battery clamp 23 to the negative battery terminal 25 and the test contact 26 to the positive battery terminal 34 the current flow which would light the red LED 32 would be through the negative battery terminal cable 21, through the secondary winding 15 of the transformer 13 to either or both of the diodes 16 and 17, and further through the resistor 22a in parallel to diode 17 to the positive battery booster cable 20.

The power supply 12b of FIG. 3 is similar to the power supply of 12a of FIG. 2 in that current is likewise directed through the transformer secondary winding 15 in order to complete the indicator circuit in either direction of current. For a positive connection with the battery clamp 23 connected to the positive battery terminal 24 and test contact 26 connected to the negative battery terminal 35, the current flow would be through the positive battery cable 20, and then in parallel through the selenium rectifier diodes 16 and 17 having the intrinsic resistances 22b and 22c. While the selenium rectifier diodes 16 and 17 would indeed be reversed biased at this time, sufficient reverse circuit leakage would occur through the rectifiers and then through the transformer secondary winding 15 to the negative battery booster cable 21.

It will now be assumed that the transformer primary winding 14 has been connected to a source of AC current and that a rectified DC voltage now appears across the battery cables 20 and 21 and across the resistor 22. When the battery positive clamp 23 is incorrectly connected to the negative battery terminal 35, and the test contact 26 is connected to the positive battery terminal 34, the voltage of the battery 11 and the fully rectified AC voltage output of the battery power supply will provide a voltage across the polarity indicating means that will light only the red LED 32. During the parts of the rectified DC cycle in which the charger voltage is less than that of the battery 11, the voltage appearing across the resistor 22 will be substantially that of the battery 11 and when the voltage wave form is greater than that of the battery voltage 11, the voltage appearing across the resistor 22 will be substantially equal to the sum of the charger and battery voltages.

When the positive battery terminal clamp 23 is connected to the positive terminal 34 and the test contact 26 is connected to the negative battery terminal 35, two possibilities exist. If the rectified DC voltage output of the power supply 12 is not sufficiently greater than the voltage of the battery 11, the red LED 32 will not light and the green LED 27 will light, indicating that it is allright to connect the negative terminal clamp 24. Conduction through the green LED 27 will occur during the time that the voltage wave form of the power supply 12 is sufficiently less than that of the battery 11.

If the voltage wave form of the battery power supply 12 is sufficiently greater than the voltage of the battery 11, the green LED 27 will continue to light during the part of the wave form when the battery power supply 12 voltage is low. On the voltage peaks, when the voltage appearing across the rectifier 22 is sufficiently greater than the battery voltage 11, the red LED 32 would be forward biased and it would also light. Under these conditions, both the LEDs 27 and 32 will appear to be lighted to the user of the battery charger assembly 10. The LEDs 27 and 32 are being lit intermittently. However, to the eye, it will appear that both LEDs 27 and 32 are glowing. Under such conditions, the operator of the battery charger assembly 10 is warned that a potentially dangerous situation exists should the final connection with the battery terminal clamps 24 be made at this time.

This greater voltage from the battery power supply 12 could cause substantial arcing and sparking if the connection of the battery terminal clamps 24 were made to the battery terminal 35, with the resultant possibility of explosion of the battery 11. Under these conditions, the user of the battery booster assembly 10 must disconnect the power from the battery power supply 12 and check for proper polarity of connection of the terminal clamp 23 and test contact 26. Once the proper polarity has been determined, the final connection of the clamp 24 can be made to the battery terminal 35, and after such connection, the power can then be applied to the power supply 12 in order to charge the battery 11.

Another advantage of the battery booster assembly 10 is that the battery jaw contacts 42 and 43 of clamps 24 must be sufficiently clean and not corroded in order for the polarity means to give any indication because the jaw contacts 42 and 43 form part of the test circuit. Likewise, if the similar jaw contacts on the positive battery clamp 23 are not making good electrical connection to the positive terminal 34, the circuit to the battery will not be completed. The operator of the battery booster assembly should check for such dangerous connection conditions before connecting the charger to the battery 11.

I claim as my invention:

1. A battery charger assembly for charging a battery with two terminals comprising:
   (a) a battery charger power supply having a positive output and negative output for providing a rectified DC voltage output and including a transformer and at least one rectifier diode,
   (b) a continuous negative cable connected to the negative output,
   (c) a continuous positive cable connection to the positive output,
   (d) a pair of clamps, one clamp being connected to each of the cables, and
   (e) polarity indicating means connected to one of the clamps, the polarity indicating means including:
      1. a test contact for contacting a terminal of the battery,
      2. a first indicator serially connected between the test contact and said one of said clamps for indicating a first polarity connection, and
      3. a second indicator serially connected between the test contact and said one of said clamps for indicating a second opposite polarity condition, whereby when said test contact is brought into contact with said terminal of the battery and the other of said clamps is connected to the other terminal of the battery, an electrical circuit between the battery terminals will be completed through the battery charger assembly, said electrical circuit including said test contact, said first or second indicator, said one of said clamps, one of said cables, the other of said cables, and said other clamp.

2. A battery charger assembly as defined in claim 1, in which:
   (f) the first and second indicators are connected for indicating if the battery charger voltage output is greater than the voltage of the battery.

3. A battery charger assembly as defined in claim 1, in which:
   (f) a resistor connected across the power supply output provides an electrical connection between the positive and negative cables.

4. A battery charger assembly as defined in claim 1, in which:
   (f) a resistor connected in parallel with the rectifier diode for providing an electrical connection between the positive and negative cables.

5. A battery charger assembly as defined in claim 1, in which:
   (f) the rectifier diode is a selenium rectifier, the selenium rectifier providing an electrical connection between the positive and negative cables.

6. A battery charger assembly as defined in claim 1, in which:
   (f) the polarity indicating means is carried by and electrically connected to one of the clamps,
   (g) said one clamp includes opposed side jaw contacts, the cable associated with said one clamp being electrically connected to one of the jaw contacts,
   (h) the polarity indicating means is electrically connected to the other jaw contact, and
   (i) the jaw contacts electrically engage when the clamp is closed to electrically connect the polarity indicating means to the said cable.

7. A battery charger assembly as defined in claim 1, in which:
   (f) the first indicator is a green LED, and
   (g) the second indicator is a red LED.

8. A battery charger assembly as defined in claim 5, in which:
   (g) the first indicator is a green LED, and
   (h) the second indicator is a red LED.

* * * * *

UNITED STATES PATENT AND TRADEMARK OFFICE
CERTIFICATE OF CORRECTION

PATENT NO. : 4,447,785
DATED : May 8, 1984
INVENTOR(S) : Bruce R. Wright

It is certified that error appears in the above-identified patent and that said Letters Patent are hereby corrected as shown below:

Column 6:

Line 35, delete "connection" and insert --connected--.
  Line 45, delete "connection" and insert --condition--.

Signed and Sealed this

Twenty-eighth Day of August 1984

[SEAL]

Attest:

GERALD J. MOSSINGHOFF

Attesting Officer           Commissioner of Patents and Trademarks